Dec. 3, 1935.  H. A. EMBERY ET AL  2,022,709
THERMOSTATIC CONTROL APPARATUS FOR VEHICLE FANS
Filed May 10, 1933  2 Sheets-Sheet 1

Inventors
HARRY A. EMBERY
ALEXANDER WELSH
By A. B. Bowman
Attorney

Dec. 3, 1935.  H. A. EMBERY ET AL  2,022,709
THERMOSTATIC CONTROL APPARATUS FOR VEHICLE FANS
Filed May 10, 1933  2 Sheets-Sheet 2

Inventors
HARRY A. EMBERY
ALEXANDER WELSH
By A. B. Bowman
Attorney

Patented Dec. 3, 1935

2,022,709

UNITED STATES PATENT OFFICE 2,022,709

THERMOSTATIC CONTROL APPARATUS FOR VEHICLE FANS

Harry A. Embery and Alexander Welsh, La Jolla, Calif., assignors of one-third to Joseph J. Richert, Pacific Beach, Calif.

Application May 10, 1933, Serial No. 670,275

5 Claims. (Cl. 123—171)

Our invention relates to thermostatic control apparatus for vehicle fans and the objects of our invention are:

First, to provide a control apparatus of this nature which automatically disconnects the fan from the engine as long as the temperature of the engine is below a predetermined value, thereby providing an apparatus whereby the fan is inoperative until the temperature of the engine has reached a desired value;

Second, to provide an apparatus of this class which eliminates or reduces the necessity of providing shutters or the like on the radiator;

Third, to provide an apparatus of this class wherein the fan is freely revoluble when disconnected from the pulley or other driving means so that the fan may rotate in response to the flow of air through the radiator and around the engine; thus the blade is free to revolve faster or slower than the normal driving speed therefor as the case may be;

Fourth, to provide an apparatus of this class which though thermostatically controlled is operated from the intake manifold or other source of negative fluid pressure;

Fifth, to provide an apparatus of this class wherein the fan is normally connected to its driving means, thus should the apparatus fail to act the fan merely remains coupled to the driving means;

Sixth, to provide a novelly arranged thermostatically controlled valve for connecting the vacuum responsive portions of the apparatus with the intake manifold of an engine; and Seventh, to provide on the whole a novelly constructed thermostatic control apparatus for vehicle fans which is durable, efficient in its action, and which will not readily deteriorate or get out of order.

Figure 1:
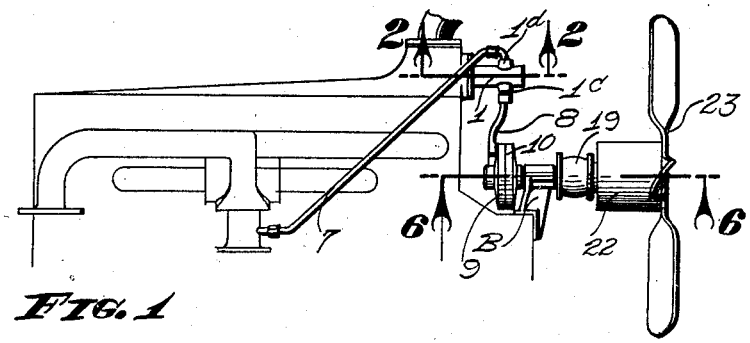
Figures 2, 4:
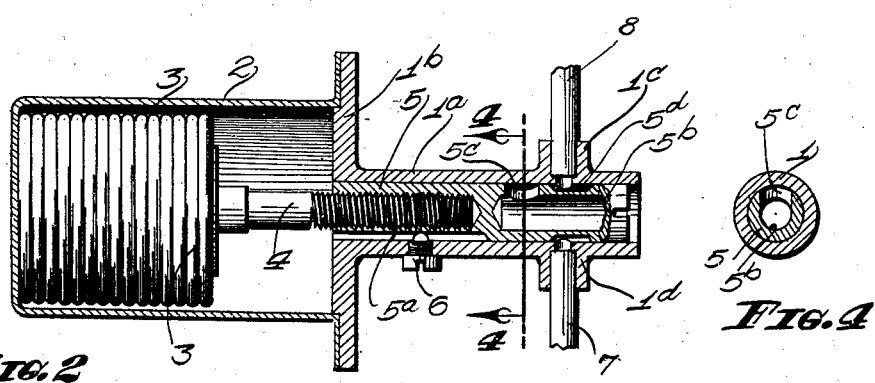
Figures 3, 5:
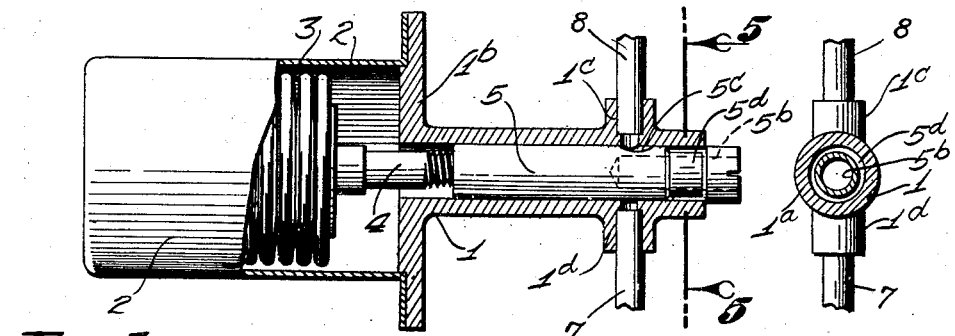
Figure 6:
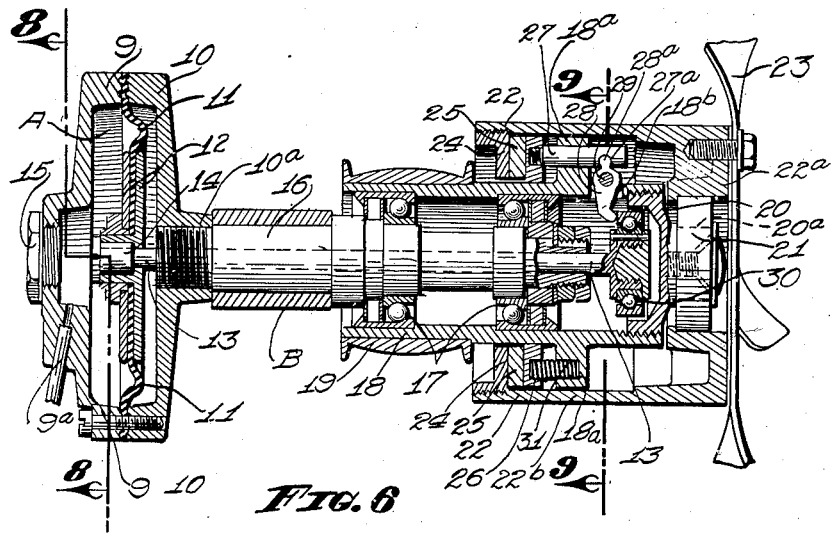
Figure 7:
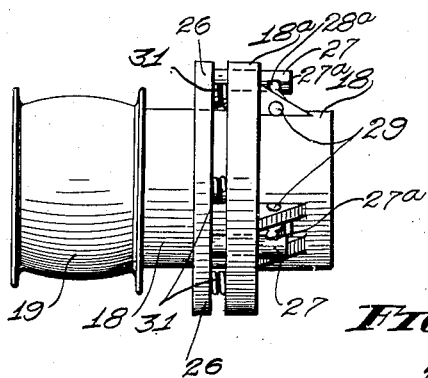
Figure 8:
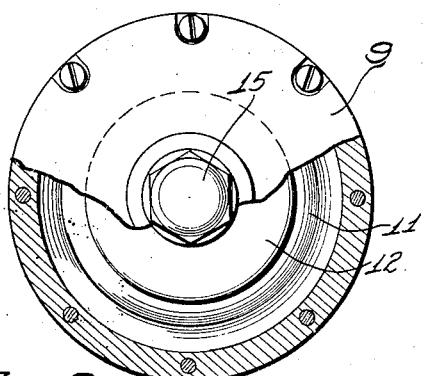
Figure 9:
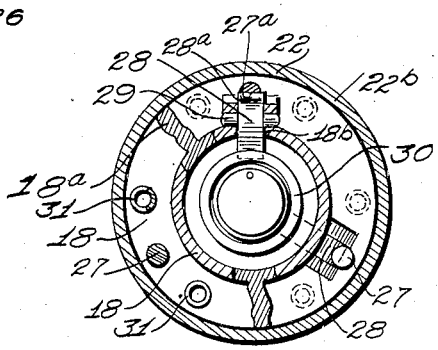

With these and other objects in view as will appear hereinafter, our invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a diagrammatical and fragmentary view of an internal combustion engine illustrating the application of our thermostatic control apparatus thereto; Fig. 2 is an enlarged sectional view of the thermostatic control valve mechanism taken substantially through 2—2 of Fig. 1; Fig. 3 is a view similar to Fig. 2 showing the valve in its extended position and with parts and portions in elevation; Fig. 4 is a transverse sectional view thereof through 4—4 of Fig. 2; and Fig. 5 is a transverse sectional view thereof through 5—5 of Fig. 3; Fig. 6 is a sectional view of the clutch mechanism and the thermostatic responsive mechanism of our apparatus taken substantially through 6—6 of Fig. 1; Fig. 7 is an elevational view of the clutch mechanism with the casing and associated portions removed; Fig. 8 is a partial elevational partial sectional view through 8—8 of Fig. 6; and Fig. 9 is a transverse sectional view through the clutch mechanism taken through 9—9 of Fig. 6.

Similar characters of reference refer to similar parts and portions throughout the several views of the drawings.

Valve casing 1, shell 2, thermostat element 3, stem 4, valve member 5, set screw 6, tubes 7, and 8, casing members 9 and 10, diaphragm 11, clamp elements 12, shaft 13, cap screw 14, plug 15, spindle 16, bearings 17, hub 18, pulley 19, end member 20, bearing 21, casing 22, fan blades 23, clutch ring 24, clutch facing material 25, clutch plate 26, pins 27, levers 28, pins 29, thrust bearing 30, and springs 31, constitute the principal parts and portions of our novel thermostatic control apparatus.

Our thermostatic control apparatus includes a thermostatically operated valve mechanism associated with the water circulating system of the internal combustion engine. The control valve mechanism comprises a valve casing 1 having a tubular portion 1a terminating at one end in a suitable flange 1b which may be secured in any manner to the cylinder block, preferably adjacent or associated with the water outlet thereof. Secured with the flange 1a to the cylinder block is a shell 2 which extends into the water circulating passage. A suitable thermostat element 3 is mounted within the shell 2. The thermostat element is attached to the extended end of the shell 2 and is of such a nature as to expand and contract along the axis of the valve casing 1, as shown in Figs. 2 and 3. Attached to the thermostat element 3 is a stem 4 which extends into the valve casing 1 and is screwably connected to a valve member 5. The valve member 5 is slidably mounted within the casing 1 and is locked against rotation by means of a set screw 6 which protrudes into a longitudinal groove 5a formed in the side of the valve member. The extended end of the valve member 5 is provided with a relatively deep socket 5b which is intersected at its inner end by a radially directed opening 5c. Between the opening 5c and the extremity of the valve member 5 the periphery thereof is provided with an annular channel 5d which does not communicate with the socket 5b. Formed in the valve casing 1 are a pair of tubular portions 1c and 1d which intersect the bore of the valve casing 1. The tubular portions are adapted to register simultaneously with the annular channel 5d so as to be connected thereby, while the tubular portion 1c is registerable upon shifting of the valve member, with the aperture 5c. The tubular portion 1d however is closed when the valve member is shifted outwardly, as shown in Fig. 3. Said tubular portion 1d is connected by a tube 7 to the intake manifold of the internal combustion engine, as shown in Fig. 1. The other tubular portion 1c is connected by a tube 8 to a pressure responsive device.

The pressure responsive device includes a pair of casing members 9 and 10 which are adapted to be secured together at their peripheries and define a circular but relative flat chamber. Secured between the casing members 9 and 10 is a flexible diaphragm 11 which divides the chamber formed by the casing members into two relatively sealed portions. The central portion of the diaphragm 11 is held by clamp elements 12 which are rigid in their nature. The clamp elements 12 are provided with a centrally disposed aperture which receives an end of a shaft 13. The shaft 13 is secured relative to the clamp elements by a cap screw 14. The cap screw 14 is disposed within the casing member 9 and said casing is provided with a plug 15 to permit access to the cap screw 14. The casing member 9 is also provided with a tubular portion 9a which is attached to the tube 8 so as to be in communication with the intake manifold of the engine. The casing member 9 and the diaphragm 11 thus form a sealed chamber, designated A.

The casing 10 is provided with a centrally disposed boss portion 10a which is adapted to be secured to one end of a spindle 16. The spindle 16 is secured relative to the internal combustion engine by a suitable bracket, designated B, or the like, this bracket in most cases being conventional particularly when the spindle 16 is substituted for the conventional fan pulley spindle. The remaining end of the spindle 16 extends forwardly of the bracket B. Said spindle is provided with a longitudinally extending bore therethrough in which is slidably mounted the shaft 13. The forward portion of the spindle 16 supports by means of bearings 17 a cylindrical hub 18. At its inner end adjacent the bracket B the hub 18 is provided with a pulley 19 which is secured thereto.

The opposite or extended end of the hub 18 is provided with an end member 20 which is removably secured thereto and which forms a short spindle portion 20a upon which is mounted a bearing 21. A casing 22 is provided which is cylindrical in form with an internal flange 22a at one end which is secured to the bearing 21 so as to be supported in revoluble relation with the hub 18. The cylindrical portion, designated 22b, of the casing extends rearwardly over and in spaced relation to the hub 18; its inner extremity terminating adjacent the pulley 19. The outer end of the casing 22 is arranged to support a plurality of fan blades 23.

Secured to the casing 22 at its axially inner end and forming therewith an internal flange is a clutch ring 24; upon the axially forward face, that is the face within the casing 22, there is secured a ring of clutch facing material 25. The clutch facing 25 is engaged by an annular clutch plate 26 mounted within the casing 22. The clutch plate 26 is supported by a plurality of pins 27 which extend axially forwardly parallel with the axis of the casing and hub and between said members. The pins 27 protrude through a flange 18a formed around the hub 18 and are slidably supported thereby. The axially forward ends of the pins 27 are provided at their radially inner sides with notch portions 27a which are engaged by arms 28a of radially inwardly extending levers 28. The levers 28 are supported intermediate their ends by means of pins 29 journaled between lugs suitably positioned around the hub 18. The levers 28 extend into the hub 18 through slots 18b therein and their radially inner arm portions engage a thrust bearing 30 which is secured to the axially forward end of the shaft 13.

Springs 31 are provided between the clutch plate 26 and the flange 18a so that the clutch plate normally occupies a position against the clutch facing whereby the fan 23 is rigidly connected with the pulley 19.

Operation of our thermostatic control apparatus is as follows: When the engine is cool the valve member 5 is in the position shown in Fig. 2, whereupon with the engine running, air is withdrawn from the chamber A of the pressure responsive device causing the shaft 13 to move rearwardly and thereby causing the pins 27 through the thrust bearing 30 and levers 28 to draw the clutch plate 26 away from the clutch facing 25 against the action of the springs 31 whereby the fan blades 23 are free to revolve with respect to the pulley 19. As the engine warms the thermostatic element expands causing the channel 5d to move out of registry with the tubular portions 1c and 1d and shifting the aperture 5c in registry with the tubular portion 1c. When this condition obtains the parts are in the position shown in Fig. 3 and air is allowed to enter the chamber A through socket 5b, aperture 5c and tube 8, whereupon the springs 31 bring the clutch plate into contact with the clutch facing, whereupon the pulley 19 drives the fan blades.

Under normal operating conditions, particularly when the load on the engine is slight as on a level road, the flow of air through the radiator around the engine is actually greater in velocity than the velocity of the current produced by the fan blades. Thus the air is actually tending to drive the fan blades and the fan blades perform no useful work.

Though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In a thermostatic control apparatus for vehicle fans, a spindle, a driving means revolubly mounted thereon, a casing revolubly mounted with respect to said driving means, a fan secured to said casing, clutch mechanism for connecting said fan and driving means enclosed in said casing, springs in said casing tending to hold said fan and driving means in engaged relation, a pressure responsive diaphragm means operatively associated with said clutch mechanism, and a thermostatic control valve associated with the heated portion of said engine for connecting said pressure responsive means with a source of sub-atmospheric pressure on the opposite side of said diaphragm from said clutch and arranged to oppose said springs whereby when the temperature of the engine is within a predetermined range said pressure responsive means operates against the tendency of said springs in said casing to disengage said clutch mechanism and free the fan of its driving means.

2. In a thermostatic control apparatus for vehicle fans, a spindle, a driving means revolubly mounted thereon, a casing revolubly mounted with respect to said driving means, a fan secured to said casing, clutch mechanism for connecting said fan and driving means enclosed in said casing, springs in said casing tending to hold said fan and driving means in engaged relation, a pressure responsive diaphragm means positively connected with said clutch mechanism, and a thermostatic control valve associated with the heated portion of said engine for connecting said pressure responsive means with a source of sub-atmospheric pressure on the opposite side of said diaphragm from said clutch and arranged to oppose said springs whereby when the temperature of the engine is within a predetermined range said pressure responsive means operates against the tendency of said springs in said casing to disengage said clutch mechanism and free the fan of its driving means, said pressure responsive means also including shaft, lever and link means mounted in said casing.

3. In a thermostatic control apparatus for vehicle fans, a spindle, a driving means revolubly mounted thereon, a casing revolubly mounted with respect to said driving means, a fan secured to said casing, clutch mechanism for connecting said fan and driving means enclosed in said casing, springs in said casing tending to hold said fan and driving means in engaged relation, a pressure responsive means positively connected with said clutch mechanism, and a thermostatic control valve associated with the heated portion of said engine for connecting said pressure responsive means with a source of sub-atmospheric pressure on the opposite side of said diaphragm from said clutch and arranged to oppose said springs whereby when the temperature of the engine is within a predetermined range said pressure responsive means operates against the tendency of said springs in said casing to disengage said clutch mechanism and free the fan of its driving means, said pressure responsive means including shaft, lever and link means mounted within said casing, and a diaphragm fluid control means positioned outwardly of said casing in connection with said spindle.

4. In a thermostatic control apparatus for vehicle fans, a fan supporting spindle, a driving means revolubly mounted thereon, a casing revolubly mounted around said fan driving means, a fan secured directly to one end of said casing, clutch mechanism for connecting said driving mechanism with said casing, springs positioned in said casing tending to hold said casing and driving means in engaged relation, a pressure responsive diaphragm means positively connected with said clutch mechanism, a thermostatic control valve associated with the heating portion of the engine for connecting said pressure responsive diaphragm means with a source of sub-atmospheric pressure on the opposite side of said diaphragm from said clutch and arranged to oppose said springs whereby when the temperature of the engine is within a predetermined range said pressure responsive means operates against the tendency of said springs in said casing to disengage said clutch mechanism and free the fan of its driving means, said pressure responsive means including a spindle connected with said diaphragm and positioned centrally in said casing on the pressure side of said diaphragm, lever and link means operatively connecting said spindle with said clutch.

5. In a thermostatic control apparatus for vehicle fans, a fan supporting spindle, a driving means revolubly mounted thereon, a casing revolubly mounted around said fan driving means, a fan secured directly to one end of said casing, clutch mechanism for connecting said driving mechanism with said casing, springs positioned in said casing tending to hold said casing and driving means in engaged relation, a pressure responsive diaphragm means positively connected with said clutch mechanism, a thermostatic control valve associated with the heating portion of the engine for connecting said pressure responsive diaphragm means with a source of sub-atmospheric pressure on the opposite side of said diaphragm from said clutch and arranged to oppose said springs whereby when the temperature of the engine is within a predetermined range said pressure responsive means operates against the tendency of said springs in said casing to disengage said clutch mechanism and free the fan of its driving means, said pressure responsive means including a spindle connected with said diaphragm and positioned centrally in said casing on the pressure side of said diaphragm, lever and link means operatively connecting said spindle with said clutch, a portion of said clutch being secured to said casing within one end thereof.

HARRY A. EMBERY.
ALEXANDER WELSH.